(12) United States Patent
Gross et al.

(10) Patent No.: US 7,292,952 B1
(45) Date of Patent: Nov. 6, 2007

(54) REPLACING A SIGNAL FROM A FAILED SENSOR IN A COMPUTER SYSTEM WITH AN ESTIMATED SIGNAL DERIVED FROM CORRELATIONS WITH OTHER SIGNALS

(75) Inventors: Kenny C. Gross, San Diego, CA (US); Aleksey M. Urmanov, San Diego, CA (US); Steve S. Lin, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 645 days.

(21) Appl. No.: 10/772,111

(22) Filed: Feb. 3, 2004

(51) Int. Cl.
*G01C 25/00* (2006.01)
*G06F 11/30* (2006.01)
(52) U.S. Cl. .................. 702/104; 702/182; 702/185
(58) Field of Classification Search ............... 702/90, 702/91, 104, 116, 181, 182, 183, 185, 186, 702/189
See application file for complete search history.

(56) References Cited

U.S. PATENT DOCUMENTS

| | | | |
|---|---|---|---|
| 4,937,763 A | 6/1990 | Mott | |
| 5,459,675 A | 10/1995 | Gross et al. | |
| 5,764,509 A * | 6/1998 | Gross et al. | .......... 700/29 |
| 5,987,399 A | 11/1999 | Wegerich et al. | ......... 702/183 |

* cited by examiner

*Primary Examiner*—Bryan Bui
(74) *Attorney, Agent, or Firm*—Park, Vaughan, & Fleming, LLP

(57) ABSTRACT

One embodiment of the present invention provides a system that enhances reliability, availability and serviceability in a computer system by replacing a signal from a failed sensor with an estimated signal derived from correlations with other instrumentation signals in the computer system. During operation, the system determines whether a sensor has failed in the computer system while the computer system is operating. If so, the system uses an estimated signal for the failed sensor in place of the actual signal from the failed sensor during subsequent operation of the computer system, wherein the estimated signal is derived from correlations with other instrumentation signals in the computer system. This allows the computer system to continue operating without the failed sensor.

27 Claims, 2 Drawing Sheets

REPLACING A SIGNAL FROM A FAILED SENSOR IN A COMPUTER SYSTEM WITH AN ESTIMATED SIGNAL DERIVED FROM CORRELATIONS WITH OTHER SIGNALS

BACKGROUND

1. Field of the Invention

The present invention relates to techniques for enhancing availability and reliability within computer systems. More specifically, the present invention relates to a method and an apparatus for replacing a signal from a failed sensor in a computer system with an estimated signal derived from correlations with other instrumentation signals in the computer system.

2. Related Art

As electronic commerce grows increasingly more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business. Hence, it is critically important to ensure high availability in such enterprise computing systems.

To achieve high availability in enterprise computing systems it is necessary to be able to capture unambiguous diagnostic information that can quickly pinpoint the source of defects in hardware or software. Some high-end servers, which cost over a million dollars each, contain hundreds of physical sensors that measure temperatures, voltages and currents throughout the system. These sensors protect the system by detecting when a parameter is out of bounds and, if necessary, shutting down a component, a system board, a domain, or the entire system. This is typically accomplished by applying threshold limits to signals received from the physical sensors. In this way, if a temperature, a current or a voltage strays outside of an allowable range, an alarm can be activated and protective measures can be taken.

Unfortunately, sensors occasionally fail in high-end servers. In fact, it is often the case that the physical sensors have a shorter mean-time-between-failure (MTBF) than the assets they are supposed to protect. Degrading sensors can cause domains or entire systems to shut down unnecessarily, which adversely affects system availability, as well as the customer quality index (CQI) and the customer loyalty index (CLI). An even worse scenario is when a sensor fails "stupid," a term used to describe failure modes in which a sensor gets stuck at or near its mean value reading, but is no longer responding to the physical variable it is supposed to measure. No threshold limit test can detect this type of failure mode. Furthermore, if there is a thermal event, or other system upset, the dead sensor provides no protection and significant damage may occur to an expensive asset, followed by a serious system outage.

Hence, what is needed is a method and an apparatus that handles a failed sensor in a computer system without unnecessarily shutting down the computer system, and without exposing the computer system to the risk of damage.

SUMMARY

One embodiment of the present invention provides a system that enhances reliability, availability and serviceability in a computer system by replacing a signal from a failed sensor with an estimated signal derived from correlations with other instrumentation signals in the computer system. During operation, the system determines whether a sensor has failed in the computer system while the computer system is operating. If so, the system uses an estimated signal for the failed sensor in place of the actual signal from the failed sensor during subsequent operation of the computer system, wherein the estimated signal is derived from correlations with other instrumentation signals in the computer system. This allows the computer system to continue operating without the failed sensor.

In a variation on this embodiment, determining whether the sensor has failed involves first deriving an estimated signal for a sensor from correlations with other instrumentation signals in the computer system, and then comparing a signal from the sensor with the estimated signal to determine whether the sensor has failed.

In a further variation, comparing the signal from the sensor with the estimated signal involves using sequential detection methods, such as the Sequential Probability Ratio Test (SPRT), to detect changes in the relationship between the signal from the failed sensor and the estimated signal.

In a variation on this embodiment, prior to determining whether the sensor has failed, the system determines correlations between instrumentation signals in the computer system, whereby the correlations can subsequently be used to generate estimated signals.

In a further variation, determining the correlations involves using a non-linear, non-parametric regression technique, such as the multivariate state estimation technique.

In a further variation, determining the correlations can involve using a neural network to determine the correlations.

In a variation on this embodiment, the instrumentation signals can include: signals associated with internal performance parameters maintained by software within the computer system; signals associated with physical performance parameters measured through sensors within the computer system; and signals associated with canary performance parameters for synthetic user transactions, which are periodically generated for the purpose of measuring quality of service from an end user's perspective.

In a variation on this embodiment, the failed sensor can be a sensor that has totally failed, or a sensor with degraded performance.

DETAILED DESCRIPTION

Figure 1:
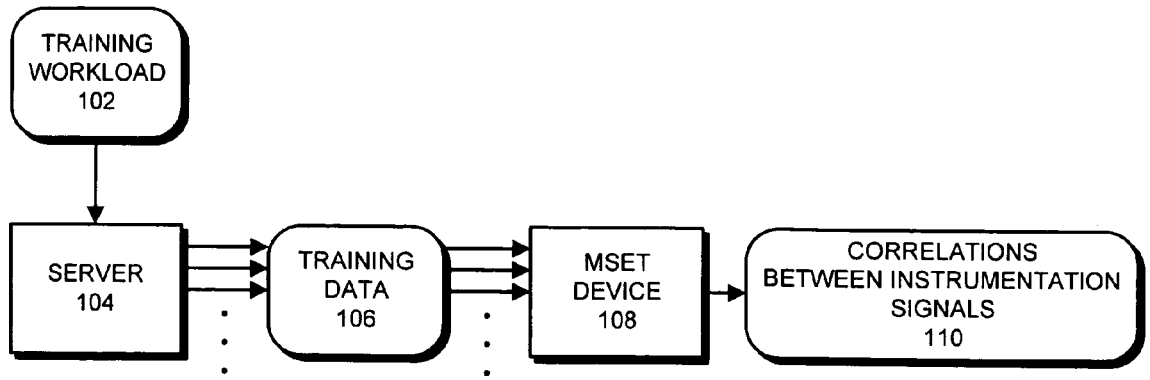
FIG. 1 illustrates a system configured to determine correlations between instrumentation signals in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Dealing with Failed Sensors

The present invention introduces a novel approach for continuously monitoring values of physical variables in complex computing systems. To this end, the present invention uses an advanced pattern recognition approach, which not only provides improved detection of physical variables drifting out of specification, but, more importantly, can detect the incipience or onset of degradation to the sensors themselves. If a sensor is degraded or failed, the present invention automatically swaps out the degraded sensor signal and swaps in an analytical estimate of the physical variable. The analytical estimate is supplied by the pattern recognition algorithm and is referred to as an "inferential sensor." This analytical estimate can be used indefinitely, or until the Field Replaceable Unit (FRU) containing the failed sensor needs to be replaced for other reasons.

The present invention continuously monitors a variety of instrumentation signals in real time during operation of the server. (Note that although we refer to a single server in this disclosure, the present invention also applies to a networked collection of servers).

The monitored parameters can include "internal parameters," such as performance parameters having to do with throughput, transaction latencies, queue lengths, load on the CPU and memories, I/O traffic, bus saturation metrics, FIFO overflow statistics; "canary parameters," such as distributed synthetic user transactions that give user quality-of-service metrics 24×7; and "physical parameters," such as distributed internal temperatures, environmental variables, currents, voltages, and time-domain reflectometry readings.

The foregoing instrumentation parameters are monitored continuously with an advanced statistical pattern recognition technique. One embodiment of the present invention uses a class of techniques known as nonlinear, nonparametric (NLNP) regression techniques, such as the Multivariate State Estimation Technique, MSET. Alternatively, the present invention can use other pattern recognition techniques, such as neural networks or other types of NLNP regression. In each case, the pattern recognition module "learns" the behavior of all the monitored variables and is able to estimate what each signal "should be" on the basis of past learned behavior and on the basis of the current readings from all correlated variables.

The present invention uses MSET to provide sensitive annunciation of the incipience or onset sensor failure events. More importantly, when a sensor failure is detected, the present invention automatically masks out the degraded signal and swaps in an MSET estimated signal. (In most situations it can be proven that the MSET estimate is even more accurate than the sensor signal it is replacing, because MSET is using many more sources of information in its estimate of the physical variable). The MSET estimate is known as an "inferential sensor" signal, and may then be used until the next time that the FRU needs to be replaced for other reasons.

The present invention is described in more detail below with reference to FIGS. 1-4.

Determining Correlations

Figure 2:
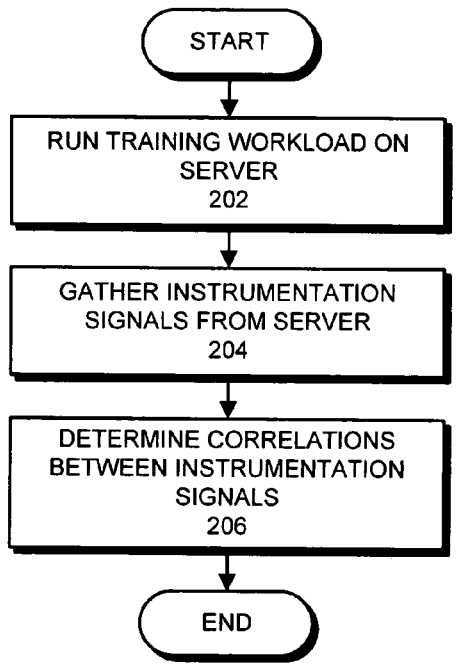
FIG. 2 presents a flow chart of the process of determining correlations between instrumentation signals in accordance with an embodiment of the present invention.

FIGS. 1 and 2 illustrate a process for determining correlations between instrumentation signals in accordance with an embodiment of the present invention. In this system, a training workload 102 is executed on a server 104 to produce instrumentation signals from potentially hundreds of sensors associated with system components within server 104 (step 202). Note that this training workload 102 can be an actual system workload gathered over different times and days of the week.

In one embodiment of the present invention, these system components from which the instrumentation signals originate are field replaceable units (FRUs), which can be independently monitored as is described below. Note that all major system units, including both hardware and software, can be decomposed into FRUs. (For example, a software FRU can include: an operating system, a middleware component, a database, or an application.)

Also note that the present invention is not meant to be limited to server computer systems. In general, the present invention can be applied to any type of computer system. This includes, but is not limited to, a computer system based on a microprocessor, a mainframe computer, a digital signal processor, a portable computing device, a personal organizer, a device controller, and a computational engine within an appliance.

These instrumentation signals from the server 104 are gathered to form a set of training data 106 (step 204). Note that these instrumentation signals can include signals associated with physical performance parameters measured through sensors within the computer system. For example, the physical parameters can include distributed temperatures within the computer system, relative humidity, cumulative or differential vibrations within the computer system, fan speed, acoustic signals, current noise, voltage noise, time-domain reflectometry (TDR) readings, and miscellaneous environmental variables.

These instrumentation signals can also include signals associated with internal performance parameters maintained by software within the computer system. For example, these internal performance parameters can include system throughput, transaction latencies, queue lengths, load on the central processing unit, load on the memory, load on the cache, I/O traffic, bus saturation metrics, FIFO overflow statistics, and various operational profiles gathered through "virtual sensors" located within the operating system.

These instrumentation signals can also include signals associated with canary performance parameters for synthetic user transactions, which are periodically generated for the purpose of measuring quality of service from the end user's perspective.

This training data feeds into a multivariate state estimation technique (MSET) device 108, which determines a set of correlations between instrumentation signals 110 (step 206). Note that the term "MSET" as used in this specification refers to a multivariate state estimation technique, which loosely represents a class of pattern recognition algorithms. For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13-17, 2000. This paper outlines several different pattern recognition approaches. Hence, the term "MSET" as used in this specification can refer to (among other things) any technique outlined in [Gribok], including Ordinary Least Squares (OLS), Support Vector Machines (SVM), Artificial Neural Networks (ANNs), MSET, or Regularized MSET (RMSET).

Once these correlations have been determined by MSET device 108, they can be used to detect a failed sensor and also to generate an estimated signal to be used in place of a signal from the failed sensor as is described below with reference to FIGS. 3 and 4.

Swapping a Signal from a Failed Sensor with an Estimated Signal

Figure 3:
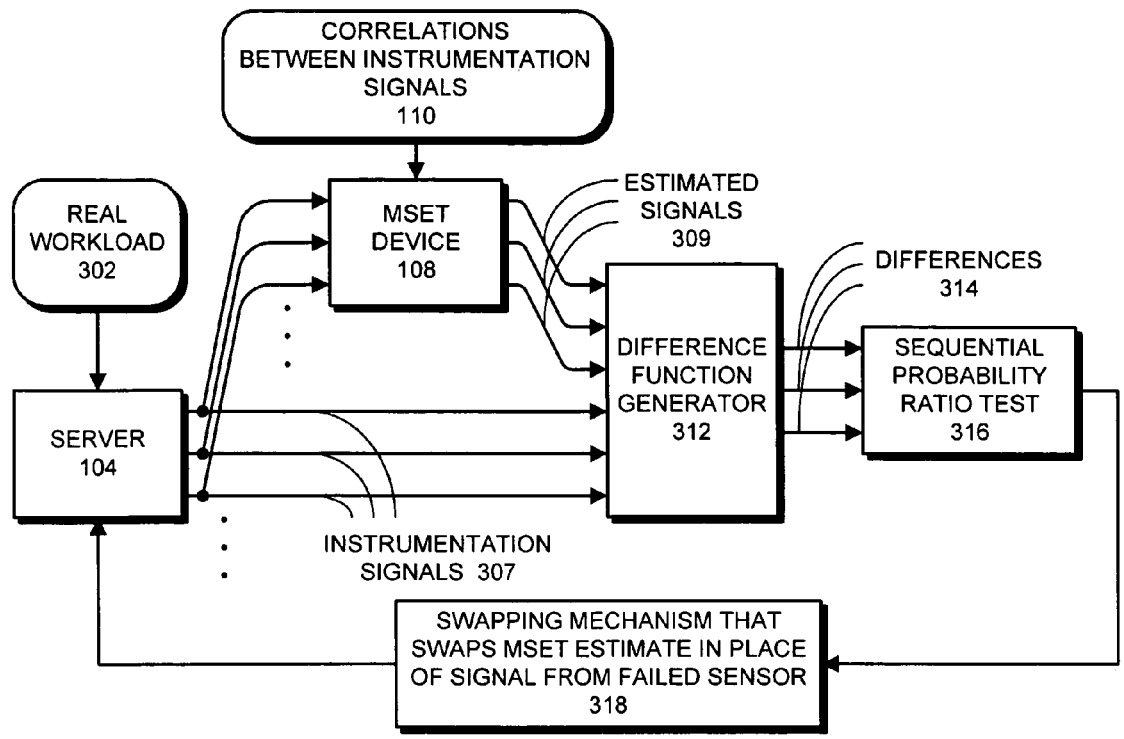
FIG. 3 illustrates a system configured to swap a signal from a failed sensor with an estimated signal in accordance with an embodiment of the present invention.
Figure 4:
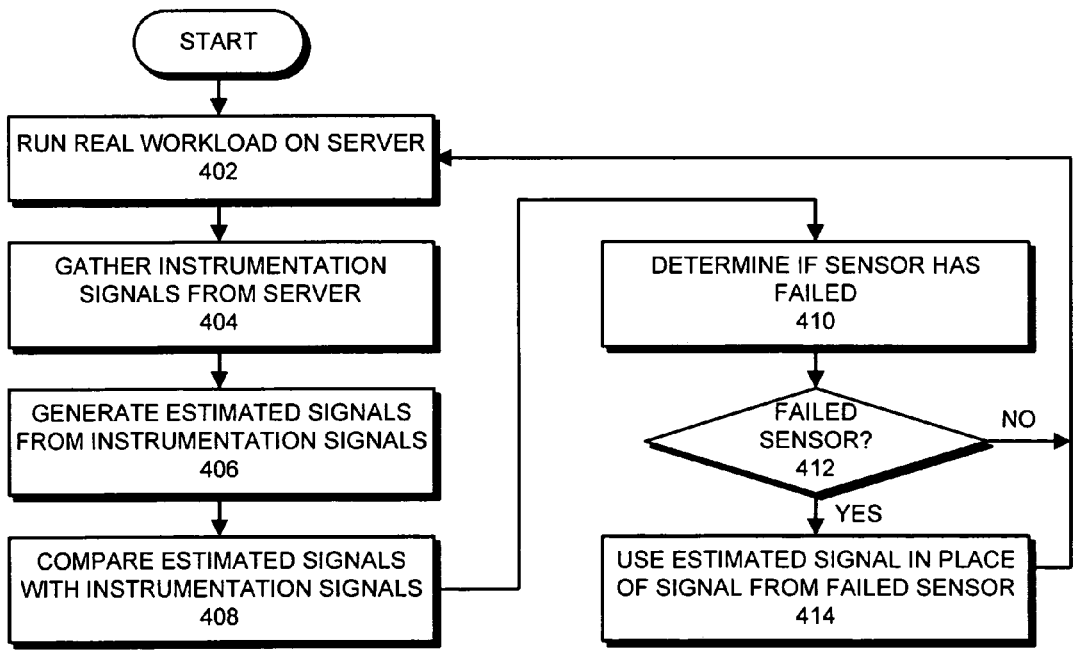
FIG. 4 presents a flow chart illustrating the process of swapping a signal from a failed sensor with an estimated signal in accordance with an embodiment of the present invention.

FIGS. 3 and 4 illustrate a process that swaps a signal from a failed sensor with an estimated signal in accordance with an embodiment of the present invention. The process starts when a real workload 302 is executed on server 104 (step 402). During this execution, the process gathers instrumentation signals 307 from possibly hundreds of sensors within server 104 (step 404). These instrumentation signals feed into MSET device 108, which uses previously determined correlations between instrumentation signals 110 to generate a set of estimated signals 309 (step 406). Note that this process generates an estimated signal for each instrumentation signal. Also, note that each estimated signal is generated by applying predetermined correlations with other signals to the actual measured values for the other signals.

Next, the instrumentation signals 307 and the estimated signals 309 feed into a difference function generator 312, which compares the signals by computing a set of pairwise differences 314 between each instrumentation signal and its corresponding estimated signal (step 408).

Next, the set of differences 314 feeds into a sequential probability ratio test (SPRT) module 316, which examines the differences 314 to determine if any physical sensor that is responsible for generating an instrumentation signal has failed (step 410). The SPRT is an extremely sensitive binary hypothesis test that can detect very subtle changes in time series signals with a high confidence factor, a high avoidance of "false positives," and a short time-to-detection. In fact, the SPRT method has the shortest mathematically possible time to annunciation for detecting a subtle anomaly in noisy process variables.

If at step 410 the system has determined that a sensor has failed, the system uses the estimated signal in place of the signal from the failed sensor (step 412). This allows the system to continue operating without the failed sensor. Note the computer system may need to use readings from the failed sensor to, for example, regulate temperature or voltage within the computer system. Also, note that the failed sensor can be replaced at a later time, such as when a component that includes the failed sensor is ultimately replaced.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for enhancing reliability, availability and serviceability in a computer system by replacing a signal from a failed sensor with an estimated signal derived from correlations with other instrumentation signals in the computer system, comprising:
   determining whether a sensor has failed in the computer system, wherein an output signal from the sensor is applied to an input; and
   applying an estimated signal to the input in response to determining that the sensor has failed, whereby the computer system can continue operating without the failed sensor;
   wherein the estimated signal is derived from correlations with other instrumentation signals, wherein the instrumentation signals include at least one of:
      signals associated with internal performance parameters maintained by software within the computer system;
      signals associated with physical performance parameters measured through sensors within the computer system; and
      signals associated with canary performance parameters for synthetic user transactions, which are periodically generated for the purpose of measuring quality of service from an end user's perspective.

2. The method of claim 1, wherein determining whether the sensor has failed involves:
   comparing the output signal from the sensor with the estimated signal to determine whether the sensor has failed.

3. The method of claim 2, wherein comparing the output signal from the sensor with the estimated signal involves using sequential detection methods to detect changes in the relationship between the output signal from the sensor and the estimated signal.

4. The method of claim 3, wherein the sequential detection methods include the Sequential Probability Ratio Test (SPRT).

5. The method of claim 1, wherein prior to determining whether the sensor has failed, the method further comprises determining correlations between instrumentation signals in the computer system, whereby the correlations can subsequently be used to generate estimated signals.

6. The method of claim 5, wherein determining the correlations involves using a non-linear, non-parametric regression technique to determine the correlations.

7. The method of claim 6, wherein the non-linear, non-parametric regression technique can include a multivariate state estimation technique.

8. The method of claim 5, wherein determining the correlations can involve using a neural network to determine the correlations.

9. The method of claim 1, wherein the failed sensor can be a sensor that has totally failed, or a sensor with degraded performance.

10. A computer-readable storage medium storing instructions that when executed by a computer cause the computer to perform a method for enhancing reliability, availability and serviceability in a computer system by replacing a signal from a failed sensor with an estimated signal derived from correlations with other instrumentation signals in the computer system, the method comprising:

determining whether a sensor has failed in the computer system, wherein an output signal from the sensor is applied to an input; and applying an estimated signal to the input in response to determining that the sensor has failed, whereby the computer system can continue operating without the failed sensor;

wherein the estimated signal is derived from correlations with other instrumentation signals, wherein the instrumentation signals include at least one of:

signals associated with internal performance parameters maintained by software within the computer system;

signals associated with physical performance parameters measured through sensors within the computer system; and signals associated with canary performance parameters for synthetic user transactions, which are periodically generated for the purpose of measuring quality of service from an end user's perspective.

11. The computer-readable storage medium of claim 10, wherein determining whether the sensor has failed involves:

comparing the output signal from the sensor with the estimated signal to determine whether the sensor has failed.

12. The computer-readable storage medium of claim 11, wherein comparing the output signal from the sensor with the estimated signal involves using sequential detection methods to detect changes in the relationship between the output signal from the sensor and the estimated signal.

13. The computer-readable storage medium of claim 12, wherein the sequential detection methods include the Sequential Probability Ratio Test (SPRT).

14. The computer-readable storage medium of claim 10, wherein prior to determining whether the sensor has failed, the method further comprises determining correlations between instrumentation signals in the computer system, whereby the correlations can subsequently be used to generate estimated signals.

15. The computer-readable storage medium of claim 14, wherein determining the correlations involves using a non-linear, non-parametric regression technique to determine the correlations.

16. The computer-readable storage medium of claim 15, wherein the non-linear, non-parametric regression technique can include a multivariate state estimation technique.

17. The computer-readable storage medium of claim 14, wherein determining the correlations can involve using a neural network to determine the correlations.

18. The computer-readable storage medium of claim 10, wherein the failed sensor can be a sensor that has totally failed, or a sensor with degraded performance.

19. An apparatus that enhances reliability, availability and serviceability in a computer system by replacing a signal from a failed sensor with an estimated signal derived from other instrumentation signals correlations with in the computer system, comprising:

a failure determination mechanism configured to determine whether a sensor has failed in the computer system, wherein an output signal from the sensor is applied to an input; and a sensor replacement mechanism, wherein if the sensor has failed, the sensor replacement mechanism is configured to apply an estimated signal to the input, whereby the computer system can continue operating without the failed sensor;

wherein the estimated signal is derived from correlations with other instrumentation signals, wherein the instrumentation signals include at least one of:

signals associated with internal performance parameters maintained by software within the computer system;

signals associated with physical performance parameters measured through sensors within the computer system; and signals associated with canary performance parameters for synthetic user transactions, which are periodically generated for the purpose of measuring quality of service from an end user's perspective.

20. The apparatus of claim 19, wherein the failure determination mechanism is configured to:

compare the output signal from the sensor with the estimated signal to determine whether the sensor has failed.

21. The apparatus of claim 20, wherein the failure detection mechanism is configured to use sequential detection methods to detect changes in the relationship between the output signal from the sensor and the estimated signal.

22. The apparatus of claim 21, wherein the sequential detection methods include the Sequential Probability Ratio Test (SPRT).

23. The apparatus of claim 19, further comprising a correlation determination mechanism, which is configured to determine correlations between instrumentation signals in the computer system, whereby the correlations can subsequently be used to generate estimated signals.

24. The apparatus of claim 23, wherein the correlation determination mechanism is configured to use a non-linear, non-parametric regression technique to determine the correlations.

25. The apparatus of claim 24, wherein the non-linear, non-parametric regression technique can include a multivariate state estimation technique.

26. The apparatus of claim 23, wherein the correlation determination mechanism is configured to use a neural network to determine the correlations.

27. The apparatus of claim 19, wherein the failed sensor can be a sensor that has totally failed, or a sensor with degraded performance.

* * * * *